United States Patent

[11] 3,603,731

[72] Inventor Paul K. Weimer
Princeton, N.J.

[21] Appl. No. 853,420
[22] Filed Aug. 27, 1969
[45] Patented Sept. 7, 1971
[73] Assignee The United States of America as represented by the Secretary of the Air Force

[54] DIGITAL SCANNING MOSAIC PHOTOSENSING SYSTEM
3 Claims, 11 Drawing Figs.

[52] U.S. Cl. .......... 178/7.1 R, 178/73, 315/164 TV, 313/108 13
[51] Int. Cl. .......... H04n 3/12
[50] Field of Search .......... 178/6 A, 6 LM, 7.5 D, 7.3 D, 7.3 E, 7.1; 315/169 TV; 313/108 B

[56] References Cited

UNITED STATES PATENTS

| | | | |
|---|---|---|---|
| 2,904,626 | 9/1959 | Rajchman et al. | 178/5.4 (EL) |
| 3,379,831 | 4/1968 | Itashimoto | 315/169 TV |
| 3,409,800 | 11/1968 | Myers et al. | 315/169 TV |
| 3,435,138 | 4/1969 | Borkan | 178/6 A |

*Primary Examiner*—Robert L. Griffin
*Assistant Examiner*—Richard P. Lange
*Attorneys*—Harry A. Herbert and Julian L. Siegel

ABSTRACT: A photosensitive array together with field effect transistors are coupled to the array's columns for video coupling; Schottky-barrier diodes are connected to the rows for vertical decoding, and field effect transistors are connected to the columns for horizontal decoding, the vertical and horizontal decoders being activated in sequence by two pairs of different speed shift registers. The diodes and transistors are formed by thin film evaporation, the diodes having a cadmium sulfide-tellurium interface and the transistors using a cadmium-selenide semiconductor. Double gate field effect transistors can be used as combination decoders and video couplers.

INVENTOR
PAUL K. WEIMER
BY Harry A. Herbert Jr.
and
Julian L. Siegel
ATTORNEYS

INVENTOR.
PAUL K. WEIMER
BY Harry A. Herbert Jr. and
Julian L. Siegel
ATTORNEYS

INVENTOR
PAUL K. WEIMER
BY Harry A. Herbert Jr. and
Julian L. Siegel
ATTORNEYS

INVENTOR.
PAUL K. WEIMER
BY Harry A. Herbert Jr. and
Julian L. Siegel
ATTORNEYS

DIGITAL SCANNING MOSAIC PHOTOSENSING SYSTEM

BACKGROUND OF THE INVENTION

This invention relates to solid-state digital scanning systems, and more particularly to thin film integrated decoders and video couplers.

Advances in the fabrication of photosensitive elements and integrated circuits have led to significant progress in the development of self-scanned image sensors which produce a video signal without the help of an electron beam. The principal parts of a common form of solid-state image sensor consists of an array of photosensitive elements, each located at the intersection of mutually perpendicular address strips, which are connected to scan generators and video coupling circuits. The application of sequential scan pulses to the address strips permits an image to be scanned, and a video signal produced similar to that generated by a television camera tube. To obtain image detail comparable to broadcast television, however, it is apparent that the array must contain hundreds of thousands of picture elements.

Solid-state sensors offer significant advantages which are of interest to potential users. Digital scanning provides a geometric accuracy of scan and a versatility of addressing not possible with electron beams. The much greater compactness of a self-scanned sensor can be important in certain applications. Finally, the reduction in cost and power consumption possible with solid-state devices should introduce many new applications which have not been feasible for existing camera tubes.

Fabrication of experimental image sensors has followed two approaches. A major portion of the work carried out has utilized highly refined silicon technologies. This approach can be justified by the enormous versatility of silicon, which provides in addition to its integrated circuits, at least four different types of photosensitive elements. These include PN junction photodiodes, phototransistors, photoconductors, and photovoltaic cells. The intrinsic spectral response of silicon ranges from the visible to the near infrared, and it can be extended into the far infrared by impurity photoconduction. Even more important to the sensor application is the fact that silicon junctions can be made with sufficiently high resistance to allow integration of light by charge storage for periods exceeding the normal television scanning periods.

In spite of the natural advantages of silicon for image sensors, the technical requirements for a self-scanned sensor are sufficiently difficult that silicon sensors have not yet been built which surpass the thin film approach, which is the subject of the present invention, in total number of picture elements or in degree of integration of the scanning circuits. Even though an integrated sensor including its scanning circuits could fit very well upon a single silicon slice, the yields of integrated devices presently obtained in silicon makes it difficult to produce an integrated self-scanned sensor having hundreds of thousands of elements. The very nature of the imaging process, and the close spacing of elements required, make it difficult to use discretionary wiring or redundancy to cover up the defective elements which produce spurious signals clearly visible in the transmitted picture. Although highly encouraging results have been obtained in the fabrication of silicon photodiode arrays for use in camera tubes, such beam-scanned arrays are considerably less effective than self-scanned arrays used in the present invention.

SUMMARY OF THE INVENTION

The present invention comprises four main sections: a photoconductive diode array; a diode decoder for vertical scanning; a transistor decoder for horizontal scanning, and a video coupling circuit consisting of a row of transistors and capacitors. The actual device is driven by two external shift registers. The four parts of the integrated sensor are deposited by evaporation on glass substrates which can be joined with the epoxy and mounted on a printed circuit card for insertion into a camera.

It is an object of the invention to provide a mosaic photosensing system having a higher resolution and sensitivity of that used in the past.

It is another object to provide a novel thin film integrated self-scan mosaic sensing system.

It is still another object to provide a diode and field effect transistor decoding system for a self-scan photosensing system.

It is still another object to provide a photosensitive array using double gate field effect transistors as a combination decoder and video coupler.

These and other advantages, features and objects of the invention will become more apparent from the following description taken in connection with the illustrative embodiments in the accompanying drawings.

DETAILED DESCRIPTION OF THE PREFERRED EMBODIMENTS

Figure 1:
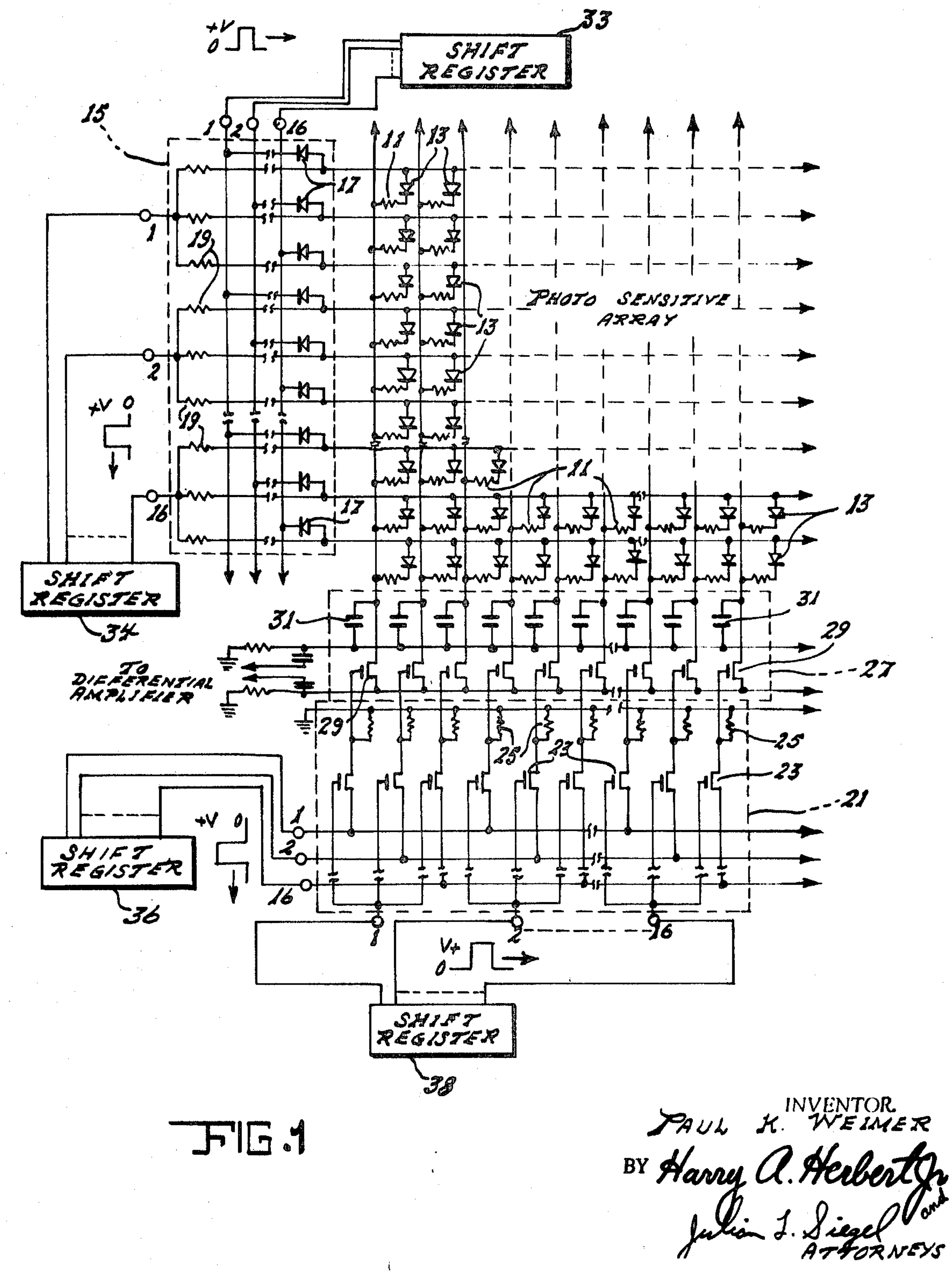
FIG. 1 is a circuit diagram of the integrated sensor including a transistor decoder for horizontal scanning, a diode decoder for vertical scanning and a video coupling circuit for signal enhancement by line storage.

FIG. 1 shows an embodiment of the invention which has 256×256 photosensitive resistive elements 11 together with their associated diodes 13. Television scanning is accomplished in the vertical direction by single level integrated decoding circuit 15 which includes diode 17 and resistances 19, and in the horizontal direction by single level integrated decoding circuits 21 which includes field effect transistors 23 and resistances 25. The horizontal decoder in the present invention provides video output leads to video coupling circuit 27 which include field effect transistors 29 and capacitors 31. Vertical decoding circuit 15 is driven by a pair of 16-stage shift registers 33 and 34 while horizontal decoding circuit 15 is driven by a pair of 16-stage shift registers 36 and 38.

Figure 2:
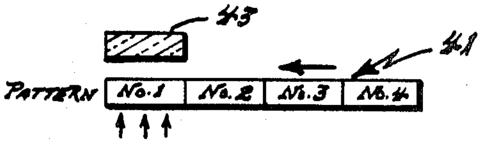
FIG. 2 shows the fabrication technique for evaporated thin film circuits.

The diodes and the field effect transistors are integrated circuits prepared using an evaporated thin film technique. A typical procedure using mechanical masks in the fabrication of thin film circuits is shown in FIG. 2 where aperture plate 41 is mounted close to substrate 43 in a vacuum system. The plate or mask contains a series of patterns which can be moved into place below the substrate in sequence by means of external controls. Each pattern area has a unique position in front of substrate 43 determined by index marks on masks or by detents in a slide carriage. The aperture plate may be formed of metal, glass, carbon, etc., and may consist of a single sheet or an assembly of coplanar sheets. Evaporation proceeds through the mask in the direction shown by the arrows in a vacuum chamber, the necessary vacuum being achieved in a single pumpdown. More than one mask can be used acting simultaneously and independently, the technique being known as "-composite masking."

The semiconductor material for the thin film field effect transistors can be polycrystalline cadmium sulfide or cadmium selenide deposited upon the glass substrate and heated to 180° C. The source and drain electrode are metal overlying the semiconductor and the coplanar structure. Evaporated silicon monoxide serves as insulators for the transistors and capacitors. The resistors can be made of nichrome.

Figure 3B:
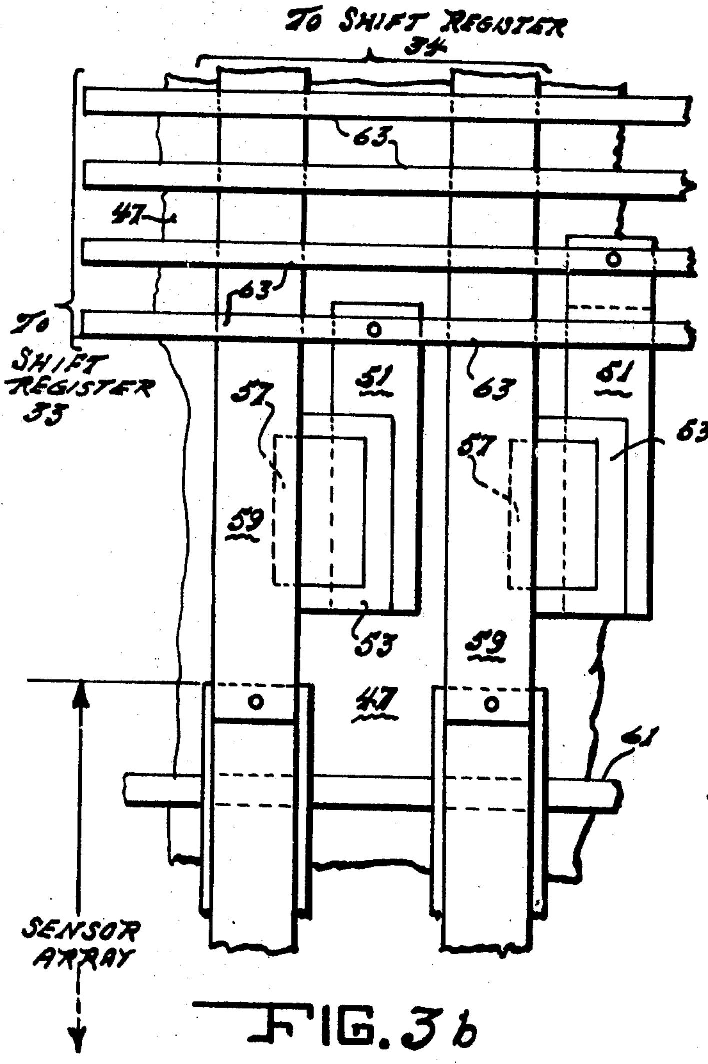
FIG. 3*b* is a plan view of the diodes showing the layers of the integrated circuit used as a vertical decoder.
Figure 3C:
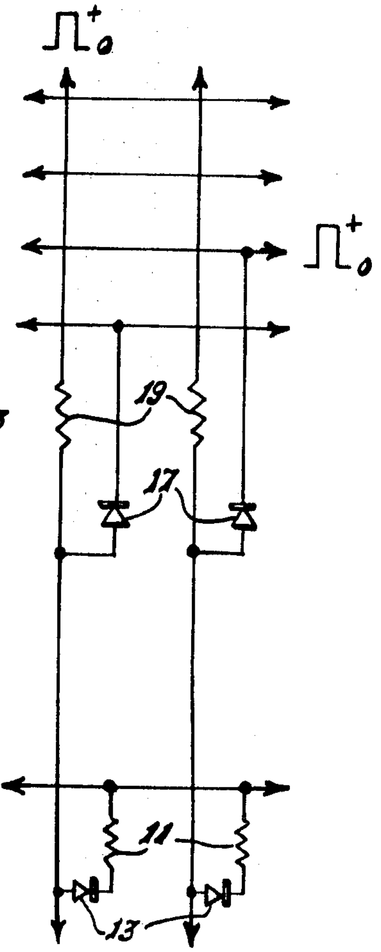
FIG. 3*c* is a circuit diagram of that shown in FIG. 3*b;*
Figure 3A:
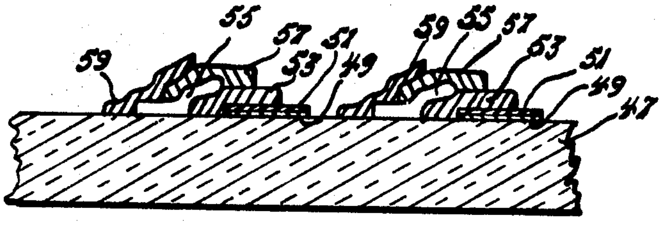
FIG. 3*a* is a cross section of the decoding Schottky-barrier diodes.

Vertical decoding circuit 15 uses Schottky-barrier diodes which are easier to fabricate than field effect transistors. A Schottky-barrier diode is a diode that has semiconductor material in contact with a metal or a substance that acts as a metal. In the present embodiment of the invention cadmium sulfide is the semiconductor and tellurium is the metal. Referring to FIG. 3*a* and 3*b* and 3*c*, gold cathode strips 49 are evaporated upon glass substrate 47 followed by layers of indium 51 upon gold cathodes 49. Cadmium sulfide layers 53 are evaporated upon indium layers 51 and are also in surface contact with substrate 47. Indium cathode contacts 51 are coincident with gold cathode strips 49 but need not extend beyond the edges of cadmium sulfide strips 53. Evaporated silicon monoxide insulator strips 55 (not shown in FIG. 3*b*) are partly in contact with cadmium sulfide strips 53 and partly in contact with substrate 47. Tellurim anode contacts 57 are partly in contact with cadmium sulfide strips 53 and partly in contact with insulators 55, and finally, gold anode strips 59 overlap tellurium contacts 57, insulators 55, and are in contact with substrate 47. The substrate is initially unheated. The silicon monoxide serves the purpose of confining the cadmium sulfide-tellurium interface area to only the top surface of the cadmium sulfide. After deposition the unit is baked in air at approximately 150° to 180° to extend the reverse breakdown voltage. Anode strips 59 are connected to the anodes of diodes 13 of the sensor array. Perpendicular strip 61 is connected to the cathodes of diodes 13 through photoresistances 11. The opposite ends of anode strips 59 are pulsed by shift register 34 while perpendicular strips 63, connecting cathodes 51, are pulsed by shift register 33. Shift register 34 operates at one-sixteenth the rate of shift register 33 and output pulses are obtained from the decoder only if both input pulses are on.

Figures 4B, 4C:
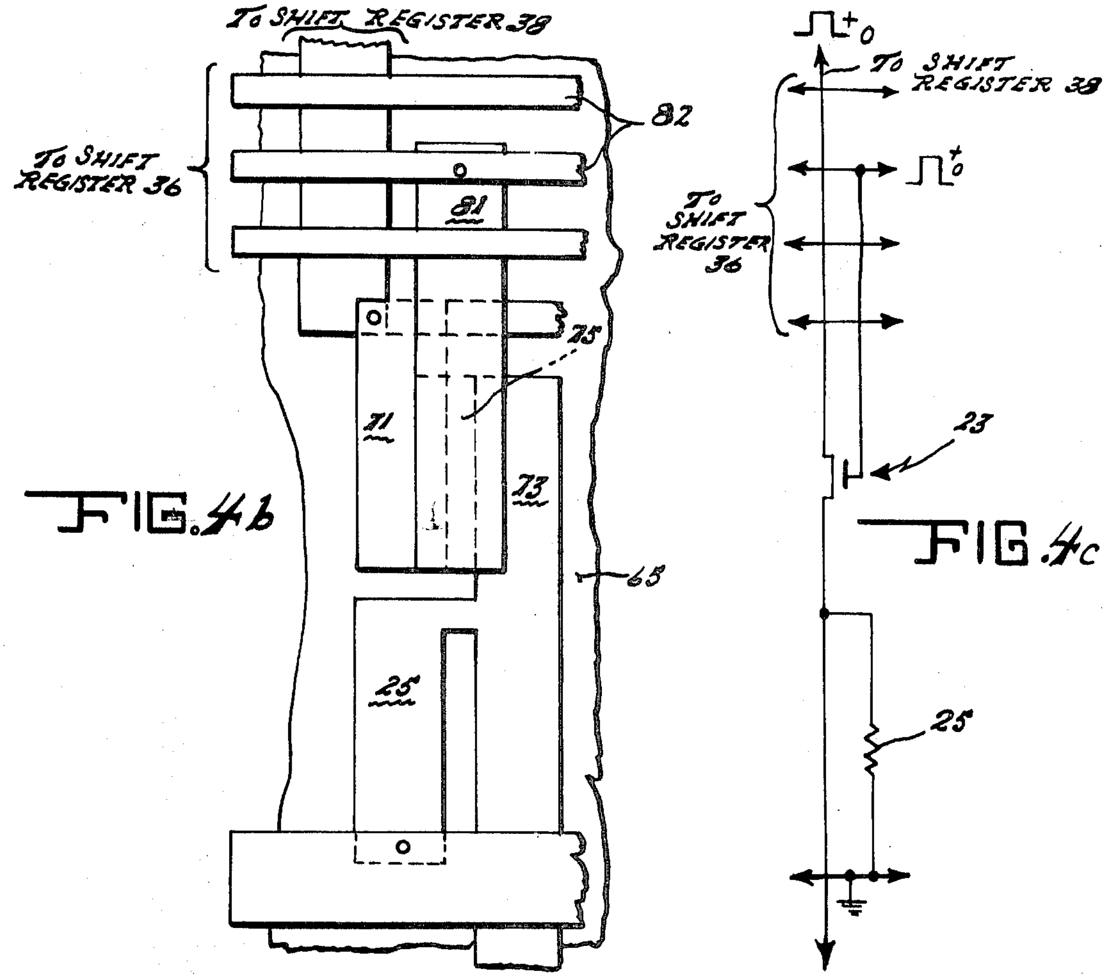
FIG. 4*b* is a plan view of the field effect transistor showing the layers of the integrated circuit used as a horizontal decoder.
FIG. 4*c* is a circuit diagram of that shown in FIG. 4*b;*
Figure 4A:
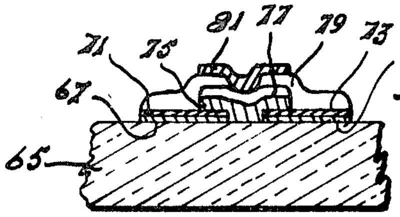
FIG. 4*a* is a cross section of a decoding field effect transistor.

Transistor decoders are superior to diode decoders in that they consume less power and are in the present embodiment used for horizontal scanning. Referring to FIGS. 4*a*, 4*b*, and 4*c*, gold drain and source contacts 67 and 69 are evaporated upon glass substrate 65 followed by coincident indium layers 71 and 73. Cadmium selenide layer 75, the semiconductor material, is evaporated upon portions of indium layer 71 and 73 and upon substrate 65 lying therebetween. Two layers of evaporated silicon monoxide insulators 77 and 79 (not shown in FIG. 4*b*) are deposited upon indium layers 71 and 73 and also cadmium selenide layer 75, thereby insulating gold gate strip 81. Drain 71 connects to low-speed shift register 38 while gate 81 connects to high-speed shift register 36 via perpendicular strips 82. Source 73 is connected to the video coupling circuits and through resistance 25 to ground. The horizontal decoders shown in FIGS. 4*b* and 4*c* differ from the horizontal decoders shown in FIG. 1 only in that the gate and drain connections of the transistors are reversed. By connecting the high-speed register to the drain instead of the gate, a faster rise and fall of the output pulses is obtained and a direct feedthrough of switching transients from the high-speed register to the video circuits are reduced. Since each scanning pulse is turned off and on through the decoder transistor, the resistor can be made larger or even eliminated entirely if the shift registers are so phased that the low-speed shift register remains on after the high-speed register at the end of each high-speed shift register pulse.

Figures 5A, 5B, 5C:
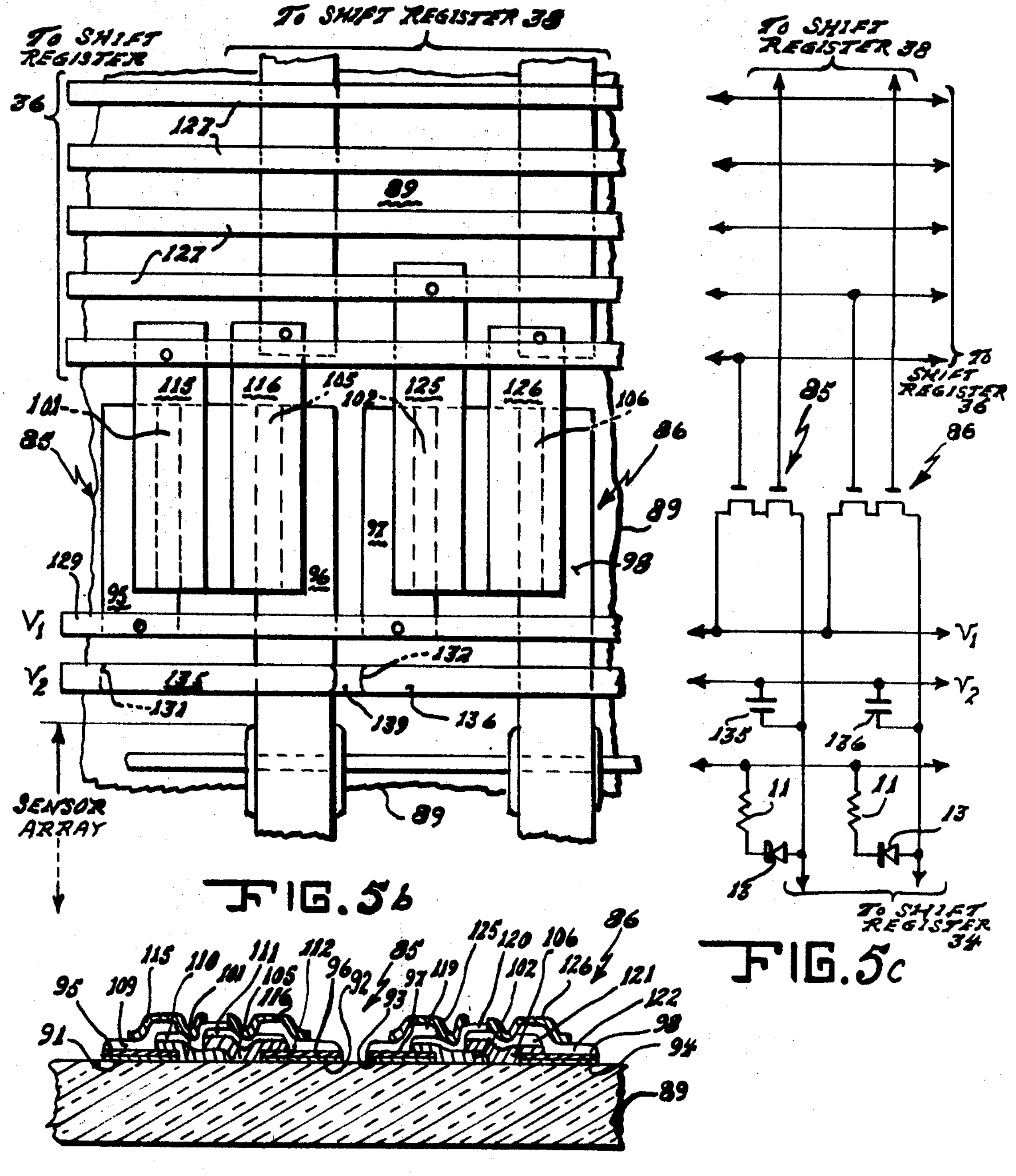
FIG. 5*a* is a cross section of double gate thin film field effect transistors.
FIG. 5*b* is a plan view of the double gate thin film field effect transistor showing the layers of the integrated circuit used as a combined decoder and video coupler.
FIG. 5*c* is a circuit diagram of that shown in FIG. 5*b*.

The double gate decoder shown in FIGS. 5*a*, 5*b*, and 5*c* is a novel compact sensor that consumes very low power and also combines a decoder with a video coupling circuit. Double gate field effect transistors 85 and 86 are formed upon glass substrate 89. Gold strips 91 and 92 representing the source and drain of transistor 85, and gold strips 93 and 94 representing the source and drain of transistor 86 are evaporated upon substrate 89. Indium contacts 95 and 98 are deposited coincidentally with sources and drains 91 to 94 respectively. The semiconductor layers 101 and 102, made of cadmium selenide, are applied partly upon sources 95 and 97 of transistors 85 and 86 and partly upon substrate 89. Second layers 105 and 106 of cadmium selenide semiconductors are applied partly upon the drains 96 and 97 of transistors 85 and 86, partly on semiconductor layers 101 and 102, partly in contact with substrate 89. For transistor 85 evaporated silicon monoxide insulators 109 to 112 (not shown in FIG. 5*b*) are deposited upon source 95 and drain 96 and semiconductor layers 101 and 105 for insulation of gold gate strips 115 and 116. For transistor 86 silicon monoxide insulators 119 to 122 are deposited upon source 97 and drain 98 and semiconductor layers 102 and 106 for insulation of gold gate strips 125 and 126. Gate contacts 116 and 126 are pulsed by low-speed shift register 38 while perpendicular metal strips 127 connecting gates 115 and 125, are pulsed by high-speed shift register 36. Perpendicular metal strip 129 is connected to sources 95 and 97. A pair of shorter perpendicular strips 131 and 132 are connected to drains 96 and 98 and constitute one of the plates of capacitors 135 and 136. The other plate of both capacitors 135 and 136 is a single perpendicular strip 139. A pair of output voltages $V_1$ and $V_2$ appear on strips 129 and 139 which are fed to a differential amplifier (not shown).

I claim:

1. A digital scanning mosaic photosensing system comprising:
   a. an array of interconnected photosensitive resistance-diode circuits, the array having rows and columns defining vertical and horizontal directions;
   b. means for decoding the array in the vertical direction, the vertical decoding means including a plurality of integrated Schottky-barrier diodes deposited upon a glass substrate connected one each to the rows of the array and each diode including,
      1. a gold strip with an indium contact, the gold strip being in surface contact with the substrate and forming a cathode,
      2. a cadmium sulfide strip partly overlapping the cathode and partly in surface contact with the substrate,
      3. an insulating strip of silicon monoxide partly overlapping the cadmium sulfide strip and partly in surface contact with the substrate,
      4. a tellurium strip partly overlapping the cadmium sulfide strip and partly overlapping the insulating strip, and
      5. a gold anode strip partly overlapping the tellurium strip, partly overlapping the silicon monoxide strip, and in surface contact with the substrate;
   c. means for decoding the array in the horizontal direction, the horizontal decoding means including a plurality of field effect transistors connected one each to the columns of the array;
   d. video coupling means including a plurality of interconnected capacitor-field effect transistor circuits one each interposed between each of the horizontal decoding field effect transistors and the photosensitive resistance-diode circuits;
   e. a pair of vertical scanning shift registers each having a different operating speed and having a plurality of outputs connected to the rows of the vertical decoding means; and
   f. a pair of horizontal scanning shift registers each having a different operating speed and having a plurality of outputs connected to the columns of the horizontal decoding means.

2. A digital scanning system according to claim 1 wherein the horizontal decoding means are thin film field effect transistors deposited upon a glass substrate, each transistor comprising:
   a. a pair of parallel gold strips, each with an indium contact, the gold strips being in surface contact with the substrate and forming source and drain terminals;

b. a cadmium selenide semiconductor strip partly overlapping the source and drain and partly in surface contact with the substrate;

c. an insulating silicon monoxide strip partly overlapping the source and drain and partly overlapping the cadmium selenide strip and d. a gold gate strip overlapping the silicon monoxide strip.

3. A digital scanning mosaic photosensing system comprising:

a. an array of interconnected photosensitive resistance-diode circuits, the array having rows and columns defining vertical and horizontal directions;

b. means for decoding the array in the vertical direction, the vertical decoding means including a plurality of diodes connected one each to the rows of the array;

c. means for horizontal decoding and video coupling including a plurality of double gate field effect transistors, one each connected to the columns of the array, and a plurality of capacitors, one each interposed between the double gate field effect transistors and the photosensitive resistance-diode circuits, the double gate field effect transistors being thin film integrated transistors deposited upon a glass substrate with each transistor including, 1. a pair of parallel gold strips, each having an indium contact, the gold strips being in surface contact with the substrate and forming source and drain terminals, 2. a cadmium selenide semiconductor strip partly overlapping the source and drain and partly in surface contact with the substrate, 3. an insulating silicon monoxide strip partly overlapping the source and drain and partly overlapping the cadmium selenide strip, and 4. a pair of parallel gold gate strips overlapping the silicon monoxide strip with one gold strip being in approximate alignment with the source and the other gold strip in approximate alignment with the drain;

d. a pair of vertical scanning shift registers, each having a different operating speed and having a plurality of outputs connected to the rows of the vertical decoding means; and e. a pair of horizontal scanning shift registers, each having a different operating speed and having a plurality of outputs connected to the columns of the horizontal decoding and video coupling means.